US006403051B1

United States Patent
Keller

(10) Patent No.: US 6,403,051 B1
(45) Date of Patent: Jun. 11, 2002

(54) RECOVERY OF SULFUR FROM $H_2S$ AND CONCURRENT PRODUCTION OF $H_2$ USING SHORT CONTACT TIME CPOX

(75) Inventor: Alfred E. Keller, Ponca City, OK (US)

(73) Assignee: Conoco Inc., Houston, TX (US)

( * ) Notice: Subject to any disclaimer, the term of this patent is extended or adjusted under 35 U.S.C. 154(b) by 35 days.

(21) Appl. No.: 09/624,715

(22) Filed: Jul. 25, 2000

Related U.S. Application Data

(60) Provisional application No. 60/146,589, filed on Jul. 30, 1999.

(51) Int. Cl.[7] .......................... C01B 17/04; C01B 3/14; C01B 3/24
(52) U.S. Cl. .................. 423/573.1; 423/245.1; 423/418.2; 423/437.1; 423/437.2; 423/576.2; 423/576.8; 423/651; 423/655
(58) Field of Search .................. 423/573.1, 576.2, 423/576.8, 651, 652, 653, 245.1, 418.2, 437.1, 437.2

(56) References Cited

U.S. PATENT DOCUMENTS

| | | | | |
|---|---|---|---|---|
| 3,752,877 | A | * 8/1973 | Beavon | 423/573.1 |
| 4,302,434 | A | * 11/1981 | Hellmer et al. | 423/573 G |
| 4,311,683 | A | 1/1982 | Hass et al. | 423/573 G |
| 4,632,043 | A | * 12/1986 | Pendergraft | 110/345 |
| 5,039,503 | A | * 8/1991 | Sauvion et al. | 423/437 |
| 5,397,556 | A | 3/1995 | Towler et al. | 423/220 |
| 5,508,013 | A | * 4/1996 | Kvasnikoff et al. | 423/220 |
| 5,654,491 | A | * 8/1997 | Goetsch et al. | 568/469.9 |

FOREIGN PATENT DOCUMENTS

FR    2 702 675 A1    9/1994    ........... B01D/53/36

OTHER PUBLICATIONS

PCT International Search Report; Dated Nov. 7, 2000; (6 p.).

* cited by examiner

*Primary Examiner*—Steven P. Griffin
*Assistant Examiner*—Timothy C Vanoy
(74) *Attorney, Agent, or Firm*—Conley, Rose & Tayon, P.C.

(57) ABSTRACT

A method, apparatus and system for treating a stream containing $H_2S$ are disclosed. A preferred method comprises mixing the stream containing $H_2S$ with a light hydrocarbon stream and an oxygen containing stream to form a feed stream; contacting the feed stream with a catalyst while simultaneously raising the temperature of the stream sufficiently to allow partial oxidation of the $H_2S$ and partial oxidation of the light hydrocarbon to produce a product stream containing elemental sulfur, $H_2O$, CO and hydrogen, and cooling the product stream sufficiently to condense at least a portion of the elemental sulfur and produce a tail gas containing CO, $H_2$, $H_2O$ and any residual elemental sulfur, and any incidental $SO_2$, COS, and $CS_2$ from the hydrocarbon stream or produced in the process. The tail gate is contacted with a hydrogenation catalyst so that CO is then reacted with water to produce $CO_2$ and hydrogen and any elemental sulfur, $SO_2$, COS, and $CS_2$ in the tail gas is preferably converted into $H_2S$. The resulting $H_2$ and $H_2S$-containing tail gas stream is then contacted with an alkanolamine absorber to remove the $H_2S$, producing a hydrogen stream which may be compressed and further purified for use in a hydrogen consuming process.

11 Claims, 2 Drawing Sheets

RECOVERY OF SULFUR FROM H₂S AND CONCURRENT PRODUCTION OF H₂ USING SHORT CONTACT TIME CPOX

CROSS-REFERENCE TO RELATED APPLICATIONS

This application claims the benefit of provisional application No. 60/146,589 filed Jul. 30, 1999, the disclosure of which is incorporated herein by reference.

STATEMENT REGARDING FEDERALLY SPONSORED RESEARCH OR DEVELOPMENT

Not applicable.

BACKGROUND OF THE INVENTION

1. Technical Field of the Invention

The present invention generally relates to methods and apparatus for recovering sulfur and hydrogen from hydrocarbon processing streams. More specifically, the present invention relates methods and apparatus for processing a mixture of hydrogen sulfide, methane and/or light alkanes and oxygen in a series of reactors to produce elemental sulfur and hydrogen.

2. Description of Related Art

Many petroleum feed streams and their separated fractions contain sulfur. Sulfur is generally undesirable in most petroleum refining products, however. Therefore, refineries typically upgrade the quality of the various petroleum fractions by removing the sulfur. Specifically, hydrodesulfurization units are used to break down the sulfur compounds in the petroleum fractions and convert the sulfur to $H_2S$. Such hydrodesulfurization units consume hydrogen because hydrogen bonds to the removed sulfur to produce the product $H_2S$. In addition, other reactions take place concurrently, including double bond saturation, aromatic saturation, and denitrification. All of these reactions consume hydrogen.

The sources of hydrogen in a refinery include the catalytic reformer. Purified hydrogen is also produced (as a byproduct) from coking and catalytic cracking reactions. It is often the case, however, that these sources of hydrogen are insufficient to supply the entire hydrogen requirements for the refinery. Hence, it is often necessary to provide hydrogen from an additional source. Hydrogen can be produced from steam reforming of light hydrocarbons, such as methane, and from the water gas shift of the steam reformer off gas. Less desirably, hydrogen can also be purchased from outside sources, usually as the byproduct of some chemical process.

In addition to hydrodesulfurization processes, other conversion processes in a typical refinery, such as fluid catalytic cracking, coking, visbreaking, and thermal cracking, produce $H_2S$ from sulfur containing petroleum fractions. The $H_2S$ from both the desulfurization processes and these conversion processes is typically removed from the gas streams or light liquid hydrocarbon streams using chemical solvents based on alkanolamine chemistry or physical solvents. A circulating, regenerative $H_2S$ removal system employing an absorption stage for $H_2S$ pickup and a regeneration stage for $H_2S$ rejection produces a concentrated stream of $H_2S$.

In conventional systems, this $H_2S$ stream is then fed to some type of $H_2S$ conversion unit, which converts the $H_2S$ into a storable, saleable product such as elemental sulfur, sodium hydrosulfide solution, or sulfuric acid. Conversion of the $H_2S$ to elemental sulfur is most common, primarily because elemental sulfur is the most marketable sulfur compound of those mentioned. The process most commonly used to recover elemental sulfur from $H_2S$ gas is the modified Claus sulfur recovery process.

The modified Claus sulfur recovery process has been in use since 1883 without significant changes. The process in its current form consists of a thermal reactor followed by waste heat removal, sulfur condensation, and varying numbers (usually two or three) of reheat, catalyst bed, and sulfur condensation stages. Many of the Claus plants are followed by Claus plant "tail gas" treatment units which process unreacted $H_2S$, $SO_2$, various compounds such as COS and $CS_2$, and elemental sulfur vapor into $H_2S$, which is then recycled back to the thermal stage of the Claus process or converted to $SO_2$, which is absorbed in aqueous solutions to form bisulfite salts. Other tail gas treatments entail either operating Claus catalyst beds at temperatures below the dew point of sulfur or direct oxidation of the remaining $H_2S$ to sulfur either over a bed of solid catalyst or in a liquid contacting device.

The thermal stage of a conventional Claus process is a burner in a refractory lined chamber. $H_2S$, along with other compounds such as $CO_2$, methane and light hydrocarbon gases, nitrogen, ammonia, and hydrogen, is fed to the burner. Air, pure oxygen, or a mixture of both is fed to the burner. A flame is used to ignite the mixture of gases. In the flame, ⅓ of the $H_2S$ is oxidized by the reaction:

$$H_2S+3/2O_2 \rightarrow SO_2+H_2O \tag{1}$$

The remaining $H_2S$ then reacts with the $SO_2$ in the flame according to the following equation, to form elemental sulfur and water:

$$2H_2S+SO_2 \rightarrow 3/xS_x+2H_2O \tag{2}$$

The overall reaction is:

$$3H_2S+3/2O_2=3/nS_n+3H_2O \tag{3}$$

The Claus combustion chamber typically operates at 950° C.–1,480° C. and converts 50 to 70% of the sulfur contained in the feed gas into elemental sulfur, depending on the temperature. The efficiency decreases with the gas residence time in the reactor. The sulfur formed by the thermal stage is recovered as a liquid by first cooling the hot reaction gases (typically from 950 to 1480° C.) in a firetube boiler, followed by condensation of the sulfur in the tubes of a low pressure steam generator. Removing the liquid sulfur allows the equilibrium Claus reaction (3) (above) to shift to the right, to form more sulfur.

At low temperatures (below about 260° C.) sulfur formation via the Claus reaction is known to be 90 to 98% efficient, but requires a catalyst to achieve an acceptable reaction rate. Hence, the gas exiting the low pressure steam generator, containing the unreacted $H_2S$ and $SO_2$ in the 2/1 ratio required for the Claus reaction, is heated to a temperature that is sufficient to initiate rapid reaction. This temperature is usually in excess of 200° C., and above the dew point of sulfur in order to keep newly-generated sulfur from condensing in the catalyst bed. Heat for this purpose can be supplied by any suitable means. The gas passes over a catalyst and the Claus reaction resumes until equilibrium is again reached. The reactor effluent stream is cooled and sulfur is again condensed out of the gas stream. The reheat of the gases, catalytic reaction, and sulfur condensation is repeated. Typically, two to three such catalytic stages are employed.

The Claus process is universally used to convert $H_2S$ to sulfur. There have been some improvements on the process, which have been related to: burner design; more active and durable catalysts; new types of reheaters; and the use of oxygen to replace air as the oxidizer. The latter improvement has significantly increased the processing capability of the process. Nevertheless, the process has remained essentially the same since its invention.

Even though it is useful both in recovering the sulfur generated in refinery processes and in reducing sulfur emissions from refineries, the process is generally viewed as relatively costly and is performed mainly out of environmental necessity. One of the economic penalties of the Claus process is that the hydrogen used to form $H_2S$ in the upstream processes is lost by forming water in the oxidation of the $H_2S$. In a refinery where the hydrogen-generating processes do not keep pace with the rate of hydrogen consumption and hydrogen must therefore be externally supplied, sulfur recovery using the Claus process is particularly undesirable. Hence, it would be desirable to have a process that effectively recovers sulfur from an $H_2S$ stream while returning usable hydrogen to the system.

SUMMARY OF THE INVENTION

The present invention provides a system, process and apparatus for recovering elemental sulfur from various streams containing $H_2S$ without adding to the hydrogen consumption load of a refinery. The apparatus comprises a Claus reactor in which the burner assembly is replaced with a reactant mixing device and a thin layer of reactor catalyst that is highly transparent. The catalyst bed is preferably separated from the mixing device by a radiation barrier (which also provides thermal insulation). The catalyst catalyzes the partial oxidation of $H_2S$ and methane in the presence of oxygen (air) to form elemental sulfur and synthesis gas (carbon monoxide and hydrogen). In certain preferred embodiments, the process includes a cobalt-molybdenum hydrogenation catalyst in contact with the tail gas, which causes a water shift reaction to produce hydrogen from CO and water.

According to certain embodiments of the invention, a method for treating a stream containing $H_2S$ comprises mixing the $H_2S$-containing stream with a light hydrocarbon stream and an oxygen containing stream to form a feed stream. The method also includes contacting the feed stream with a catalyst and raising the temperature of the stream sufficiently to allow oxidation of the $H_2S$ and partial oxidation of the light hydrocarbon to produce a product stream containing elemental sulfur, CO, and hydrogen. According to the method, the product stream is then cooled sufficiently to condense at least a portion of the elemental sulfur and produce a tail gas.

In certain embodiments, the method for treating a stream containing $H_2S$, comprises mixing the stream with a light hydrocarbon stream and an oxygen containing stream to form a feed stream. This method includes contacting the feed stream with a catalyst for less than about 10000 microseconds, and simultaneously raising the temperature of the stream sufficiently to allow oxidation of the $H_2S$ and partial oxidation of the light hydrocarbon such that a product stream containing elemental sulfur, CO, and hydrogen are produced. The method also includes cooling the product stream sufficiently to condense at least a portion of the elemental sulfur and produce a tail gas.

A system in accordance with the invention comprises employing an above-described apparatus in an above-described method. According to certain embodiments, the system includes a mixing zone, a reaction zone and a cooling zone. An $H_2S$-containing stream is mixed with a light hydrocarbon stream and an oxygen containing stream to form a feed stream in the mixing zone. In the reaction zone the feed stream is contacted with a catalyst such that elemental sulfur is formed from the $H_2S$ and such that carbon monoxide is formed from the light hydrocarbon. In the cooling zone the elemental sulfur is condensed.

BRIEF DESCRIPTION OF THE DRAWINGS

For a more detailed description of the present invention, reference will now be made to the accompanying Figures, wherein.

DETAILED DESCRIPTION OF THE PREFERRED EMBODIMENTS

Many refineries face an abundant supply of lower alkanes, i.e., $C_1$–$C_4$ alkanes such as methane, and relatively few means of converting them to more valuable products. Much research has been devoted to investigating the conversion of methane to more easily transportable products. One technique that has been developed entails the partial oxidation of light hydrocarbons in the presence of a catalyst. This technique results in the production of synthesis gas, i.e., "syngas", a mixture of CO and $H_2$. The catalytic partial oxidation of methane can be represented by the following reaction scheme:

$$CH_4 + 1/2 O_2 \rightarrow CO + 2H_2. \tag{4}$$

Such catalytic oxidation reactions are exothermnic and require good composition control in order to avoid over-oxidation resulting in too high a reaction temperature.

Several schemes for carrying out such partial oxidation are known in the art. One scheme for carrying out the exothermic oxidation reaction entails a brief exposure of the methane feed to a hot catalyst followed by cooling the resultant gas stream. A catalyst is positioned in the flow path of the feed gas. The catalyst comprises a wire gauze, several layers of wire gauze, or a porous ceramic impregnated with a catalyst.

A new system according to the present invention for carrying out catalytic partial oxidation of methane or other light hydrocarbons replaces the burner of a Claus process. In addition to $H_2S$, the feed stream includes methane (or a similar light hydrocarbon) and air, oxygen, or a mixture of both. Thus, while sulfur is produced according to Equation (3) above, additional hydrogen is generated, which allows the hydrogen originally consumed in the desulfurization process to be recovered.

Figure 1:
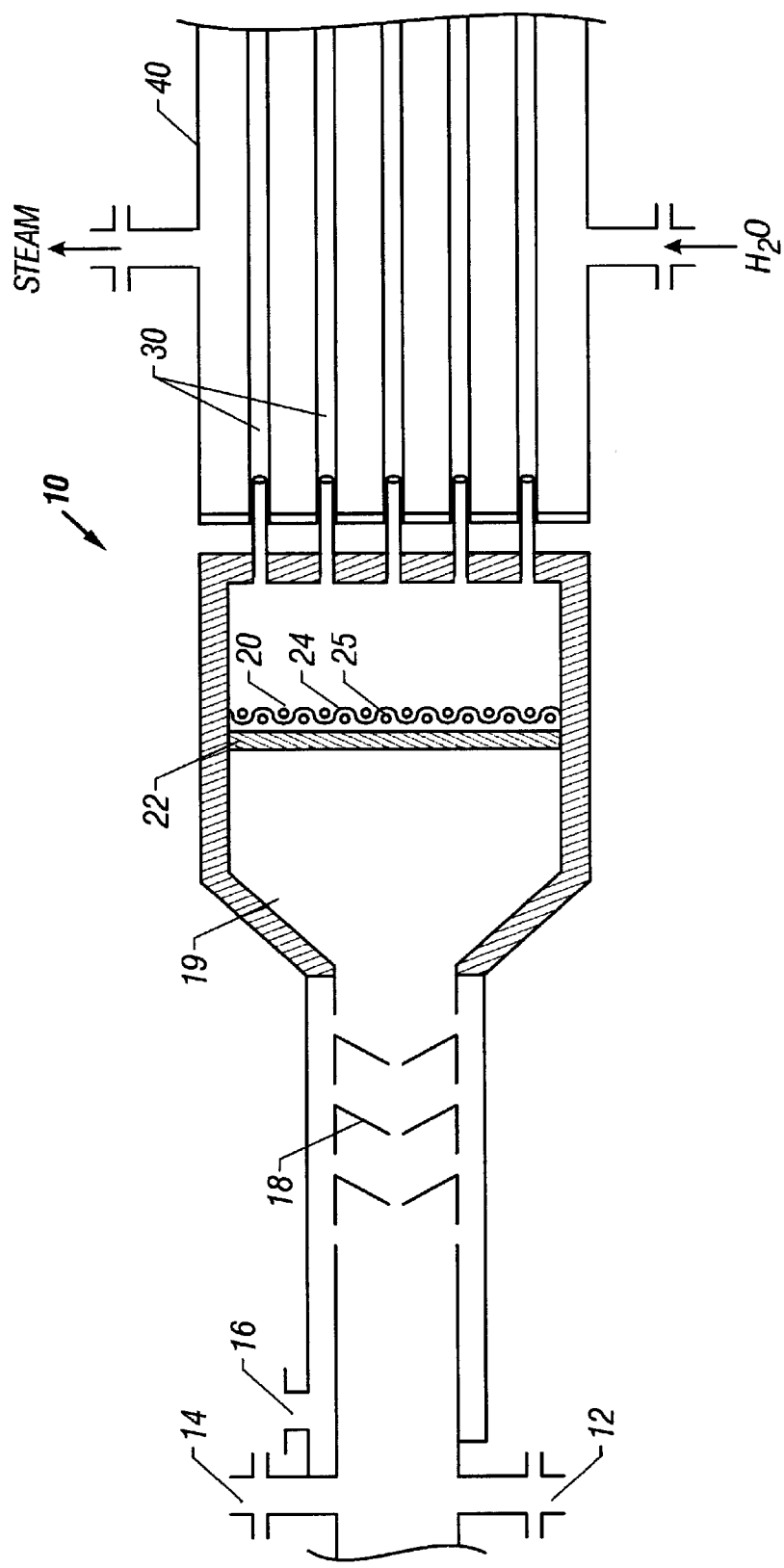
FIG. 1 is an enlarged cross-section of a reactor constructed in accordance with a preferred embodiment.

Referring initially to FIG. 1, a preferred embodiment of the present system includes a Claus reactor 10 that includes feed injection openings 12, 14, and 16, a mixing zone 19, a reaction zone 20 and a cooling zone 30. Reaction zone 20 preferably includes a thermal radiation barrier 22 positioned immediately upstream of a catalytic device 24. Radiation barrier 22 is preferably a porous ceramic or refractory material that is suited to withstand operating temperatures and provide sufficient thermal insulation, such as are described in U.S. Pat. No. 4,038,036 (Beavon) which is incorporated herein by reference in its entirety.

Catalytic device 24 is preferably a layer or layers of wire gauze 25 or a porous ceramic monolith (not shown) having a suitable catalyst supported on its surface. Gauze 25 is preferably one or more layers of a substantially planar, flexible woven metal-containing or metal-coated screen or gauze having about 20–120 mesh. More preferably, it is a gauze of metal wires about 25 micrometers to about 2.5 millimeters in diameter, which are made of about 87–93% by weight (wt-%) Pt and about 7–13 wt-% Rh. Alternative catalyst structures could include a disk with multiple perforations formed therethrough, a honeycomb-like structure, an etched foil and any other structure that provides the desired amount of transparency to effect the desired partial oxidation. A detailed discussion of the catalyst structure and composition can be found in U.S. Pat. No. 5,654,491 to Goetsch et al., which is incorporated herein in its entirety.

Examples of suitable catalysts that can be included in the metal of the gauze or incorporated at its surface include, but are not limited to, platinum, rhodium, nickel, palladium, iridium, $Pt/ZrO_2$, $Pt/Al_2O_3$.

In operation, $H_2S$ is fed into one of the feed injection openings 12. A light hydrocarbon, such as methane, is fed into a second feed injection opening 14. Air or oxygen is fed into the third feed injection opening 16. It will be understood that the feed injection openings can be configured differently from the configuration shown without affecting the principles or operation of the present system.

As the feed gases from feed injection openings 12, 14, 16 flow toward catalytic device 24, they are preferably subjected to thorough mixing by static mixer 18. During mixing, they are shielded by radiation barrier 22 from radiant heat that is generated downstream in the process. It is preferred that the temperature on the upstream side of barrier 22 be in the range of about 20° C. to about 300° C. The feed gas stream is preferably at ambient temperature prior to contact with the catalyst. Preheating the feed gas stream is not desired, as it can cause homogeneous reactions and reduce the selectivity of the process of the present invention for the desired compounds. Therefore, preheating the feed gas mixture is typically avoided, although in some applications feed gas temperatures up to about 300° C. can be tolerated.

After the gases pass barrier 22, they flow past catalytic device 24 and are simultaneously heated to an oxidation temperature in the range of from about 900° C. to about 1500° C. The gas flow rate is preferably maintained such that the contact time for the portion of the gas that contacts the catalyst is between about 0.00001 to 0.01 seconds and more preferably between about 0.001 to 0.005 seconds.

This degree of contact produces a favorable balance between competing reactions and produces sufficient heat to maintain the catalyst at approximately 900–1500° C. Specifically, sulfur is produced by catalyzed partial oxidation according to the equation:

$$H_2S + \tfrac{1}{2}O_2 \rightarrow 1/xS_x + H_2O \quad (5)$$

where x equals 2, 6, or 8, with x=2 being the most likely. At the same time, exposure to the hot catalyst partially oxidizes the hydrocarbons in the feed, according to the equation:

$$CH_4 + \tfrac{1}{2}O_2 \rightarrow CO + 2H_2. \quad (6)$$

Oxygen for these reactions comes from the air, oxygen, or air/oxygen mix that is fed into the system with the $H_2S$ and hydrocarbon feed gases.

Typically, the catalyst structure is heated as a result of the exothermic chemical reactions occurring at its surface; however, it can additionally or alternatively be heated by external means, such as electrical resistance, magnetic induction, RF, etc. Heating by external means can allow for increases in the rate at which feed gas can be passed through the catalyst structure while still obtaining desirable reaction products. In many cases it is helpful to heat the catalytic device 24 with external means at least at the start of the process, so as to initiate the exothermic reactions on the catalyst structure. This initial heating can be accomplished in any suitable manner including electrical resistance, magnetic induction, RF, or the like. Once the system is running, it is preferably run adiabatically or nearly adiabatically (i.e., without the loss of heat aside from convective losses in the exiting gas), so as to reduce the formation of solid carbon (e.g., coke) on the surface of the gauze catalyst.

The rapid heating of the feed gases as a result of contact with the hot catalyst promotes fast reaction rates. In accordance with the present invention, the feed gas stream velocity past catalyst structure 24 is preferably at least about 0.1 meter/second, often as high as 4–5 meters/second, and even as high as 70 meters/second. The maximum velocity will generally determined by the specific equipment used; however, the theoretical limit is that velocity at which the reaction would be extinguished. If an external means of heating the catalytic device 24 is used, this theoretical limit is significantly large.

According to one preferred embodiment, the feed gas stream velocity is between about 0.1 and 100 meters/second. As a result, the superficial contact time of the feed gas stream with a preferred embodiment of gauze catalytic device 24 is less than about 10,000 microseconds, and typically within a range of about 1,000–5,000 microseconds. When used in the present invention, it is preferred that the superficial contact time of the feed gas stream with the catalyst be less than about 5,000 microseconds, more preferably less than about 2,000 microseconds. As used herein, "superficial contact time" is calculated as the wire diameter divided by the feed gas stream velocity at inlet conditions (i.e., temperature and pressure at the inlet to the reactor). Superficial contact time is inversely proportional to the term "space velocity" that is used in many chemical process descriptions.

Although for ease in comparison with prior art, space velocities at standard conditions have been used to describe the present invention, it is well recognized in the art that residence time is the inverse of space velocity and that the disclosure of high space velocities equates to low residence times.

From reaction zone 20, the reacted gases enter a firetube boiler 40, where they are cooled to below 425° C. and preferably to below 340° C. As shown, it is preferred that heat removed from the partially oxidized gases can be recaptured by boiling water to make steam or the like. The rapid cooling that occurs in the boiler drops the temperature to below about 425° C. and thus ceases the above reactions. A detailed description of the considerations involved in operating a reactor using extremely small contact times is given in U.S. Pat. No. 5,654,491, which is incorporated herein by reference in its entirety.

Figure 2:
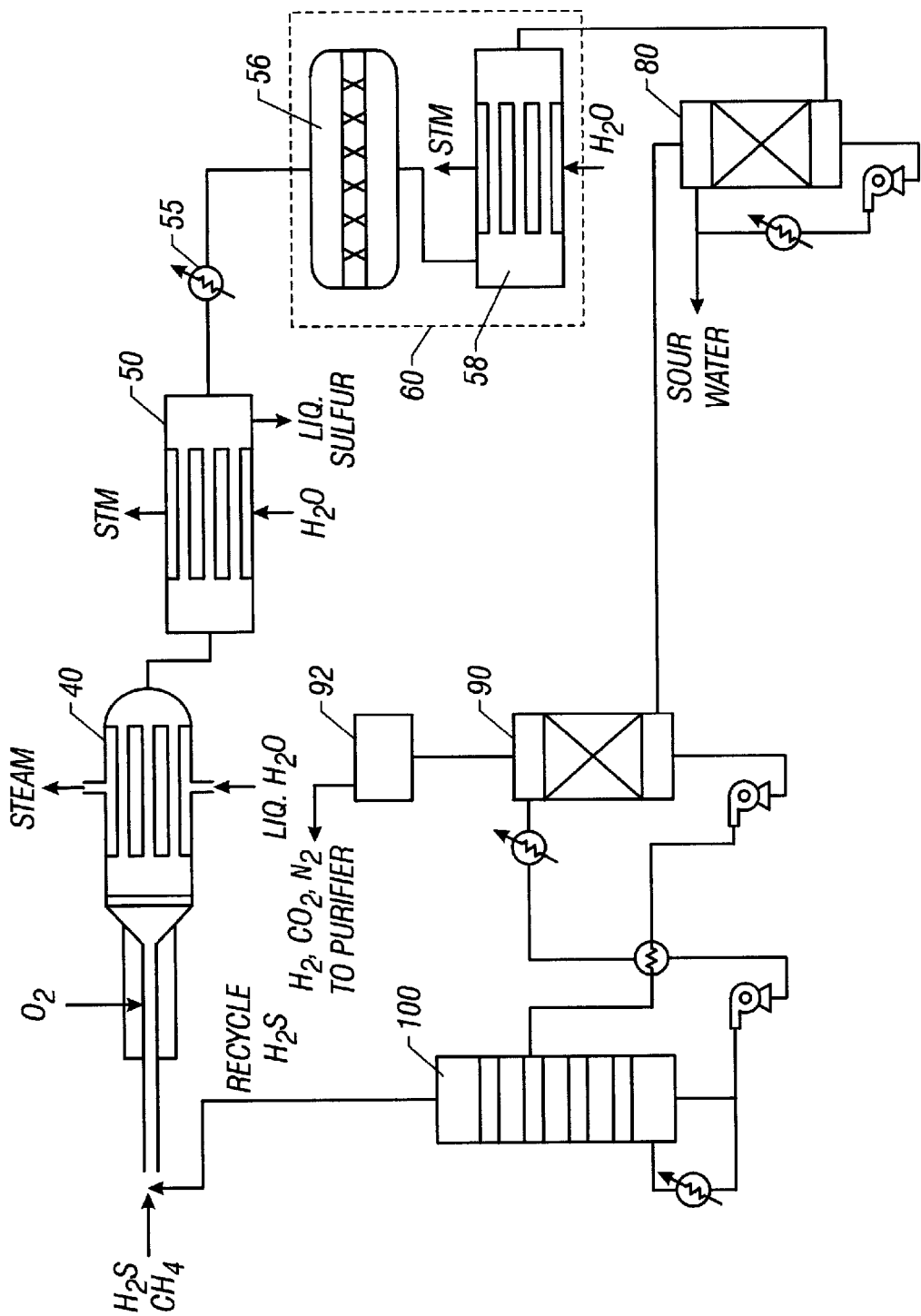
FIG. 2 is a schematic diagram of the components of one preferred embodiment of the present system including the reactor of FIG. 1.

Referring now to FIG. 2, the present system preferably includes the reactor 10, firetube boiler 40, a condenser 50, heater 55, one or more tailgas converter units 60, a quench tower 80, an amine absorber/contactor 90, compressor 92 and an amine regenerator 100. The cooled, partially oxidized gases flow from boiler 40 into condenser 50, where they are cooled further until the dew point of the elemental sulfur is reached. This allows for the removal of elemental sulfur, as desired, from the process. Once almost all of the elemental sulfur is removed, the partially oxidized gases are reheated in heat exchanger 55 and passed through one or more tailgas converter units 60. Each tailgas converter unit 60 includes at least a catalyst bed 56 in contact with the fluid and a quench device 58. More specifically, in each converter unit 60, the hot gas stream is passed over a bed of conventional cobalt-molybdenum based Claus tail gas treating unit hydrogenation catalyst. In this catalyst bed, any elemental sulfur is converted to $H_2S$. The CO in the hot gas reacts with water generated in the short contact time reactor (equation (5)) to form $CO_2$ and hydrogen according to the following equations:

$$H_2 + 1/x\ S_x \rightarrow H_2S \quad (7)$$

$$CO + H_2O \rightarrow CO_2 + H_2 \quad (8)$$

If any additional water vapor is required for the water gas shift (Equation (8)), it can be added after the sulfur condensation stage. It is desirable to carry out the water gas shift reaction, as CO will require incineration to $CO_2$ before it can be emitted from the stack. Since the water gas shift reactor forms the $CO_2$, anyway, it is much more valuable to generate hydrogen from the CO that to simply incinerate it to $CO_2$. The effluent from the water gas shift reactor(s) is then preferably cooled sufficiently to condense the bulk of any remaining water from the gas stream and to adjust the temperature of the gas to the proper level for alkanolamine treating.

Following the final quenching by counter-current flow through quench tower 80, the partially oxidized gases, including any hydrogen gas, are fed into an alkanolamine absorber 90, where $H_2S$ is removed. In absorber 90, an alkanolamine absorber, preferably based on methyl diethanolamine or diisopropanolamine, is used to remove any $H_2S$ that may be present in the product gas from the water condensation stage. The treated gases, which comprise hydrogen, nitrogen, and some $CO_2$, with trace amounts of $H_2S$, are then compressed (in compressor 92) and purified using Pressure Swing Absorption (PSA), membranes, or cryogenic separation. From this process, purified hydrogen is made available for use in the hydrogen consuming processes. The waste gas from the purification process is preferably sent to the refinery fuel system. Hence, there is no direct stack emission from the sulfur recovery unit. $H_2S$ and $CO_2$ removed from the hydrogen-rich product gas in the alkanolamine absorber go to the alkanolamine regenerator 100, where they are boiled out of the alkanolamine solution and recycled to the front of the sulfur recovery unit.

While a preferred embodiment of the present invention has been shown and described, it will be understood that variations can be to the preferred embodiment, without departing from the scope of the present invention. For example, the mixing process can be altered or replaced with an active mixer, the thermal barrier can be modified, the structure and composition of the catalyst can be varied, and the tail gas treatment steps can be modified.

The complete disclosure of all patents, patent documents, and publications cited herein are incorporated by reference. The foregoing detailed description and examples have been given for clarity of understanding only. No unnecessary limitations are to be understood therefrom. The invention is not limited to the exact details shown and described, for variations obvious to one skilled in the art will be included within the invention defined by the claims.

What is claimed is:

1. A method for treating a stream containing $H_2S$, comprising mixing the stream containing $H_2S$ with a light hydrocarbon stream and an oxygen containing stream to form a feed stream, contacting the feed stream with a catalyst and raising the temperature of the stream sufficiently to allow oxidation of the $H_2S$ and partial oxidation of the light hydrocarbon to produce a product stream containing elemental sulfur, CO, and hydrogen, and cooling the product stream sufficiently to condense at least a portion of the elemental sulfur and produce a tail gas.

2. The method according to claim 1 comprising processing the tail gas so as to react CO in the tail gas with water to produce $CO_2$ and hydrogen.

3. The method according to claim 1 comprising processing the tail gas so as to convert elemental sulfur, $SO_2$, COS, $CS_2$ in the tail gas into $H_2S$.

4. The method according to claim 1 comprising contacting the tail gas with an alkanolamine absorber to produce a treated tail gas.

5. The method according to claim 4 comprising recovering $H_2$ from the treated tail gas.

6. The method according to claim 4 comprising recovering $H_2S$ from the alkanolamine absorber.

7. The method according to claim 1 wherein contacting the feed stream with a catalyst and raising the temperature of the stream is accomplished in less than about 10,000 microseconds.

8. The method according to claim 1 wherein contacting the feed stream with a catalyst and raising the temperature of the stream is carried out adiabatically.

9. The method of claim 1 comprising maintaining a catalyst temperature of about 900° C–1,500° C.

10. The method of claim 1 wherein said catalyst comprises platinum and rhodium.

11. A method for recovering sulfur from an $H_2S$ stream and for producing $H_2$ comprising:

forming a feed gas stream comprising $H_2S$, a light hydrocarbon and $O_2$;

passing said feed gas stream over a first catalyst that is active for catalyzing the direct partial oxidation of $H_2S$ to elemental sulfur and water, and which is active for catalyzing the direct partial oxidation of methane to CO and $H_2$, such that a reacted gas stream comprising elemental sulfur, $H_2$, CO and $H_2$ is produced;

maintaining said first catalyst at a temperature in the range of 900° C. to 1,500° C.;

condensing elemental sulfur from said reacted gas stream to provide a sulfur-depleted reacted gas stream comprising CO, $H_2O$ and $H_2$;

passing said sulfur-depleted reacted gas stream over a second catalyst which catalyzes the hydrogenation of residual gaseous sulfur to $H_2S$ and which also catalyzes the water gas shift reaction between CO and $H_2O$ in the sulfur-depleted reacted gas into $CO_2$ and $H_2$, and recovering a $H_2$-containing product gas stream.

* * * * *

UNITED STATES PATENT AND TRADEMARK OFFICE
CERTIFICATE OF CORRECTION

PATENT NO. : 6,403,051 B1
DATED : June 11, 2002
INVENTOR(S) : Alfred E. Keller

It is certified that error appears in the above-identified patent and that said Letters Patent is hereby corrected as shown below:

Column 8,
Line 48, delete "H2" and insert therefor -- $H_2O$ --.

Signed and Sealed this

Eleventh Day of March, 2003

JAMES E. ROGAN
*Director of the United States Patent and Trademark Office*